US007167130B2

(12) United States Patent
Hayes (10) Patent No.: US 7,167,130 B2
(45) Date of Patent: Jan. 23, 2007

(54) INTERNAL ANTENNA AND FLAT PANEL SPEAKER ASSEMBLIES AND MOBILE TERMINALS INCLUDING THE SAME

(75) Inventor: Gerard J. Hayes, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 157 days.

(21) Appl. No.: 10/632,320

(22) Filed: Aug. 1, 2003

(65) Prior Publication Data

US 2005/0024273 A1    Feb. 3, 2005

(51) Int. Cl.
*H01Q 1/24* (2006.01)

(52) U.S. Cl. ............... 343/702; 343/702; 455/550; 455/563; 455/90; 455/575

(58) Field of Classification Search ............ 343/702, 343/700 MS, 846, 100 MS, 841, 848, 767, 343/770, 701; 455/550, 89, 575, 90, 553, 455/563, 129, 556, 566
See application file for complete search history.

(56) References Cited

U.S. PATENT DOCUMENTS

| 4,352,961 | A | * | 10/1982 | Kumada et al. | ............ 455/350 |
| 4,362,907 | A | * | 12/1982 | Polacsek | .................... 455/345 |
| 4,439,640 | A | | 3/1984 | Takaya | ........................ 179/110 |
| 5,915,020 | A | * | 6/1999 | Tilford et al. | .............. 455/3.02 |
| 5,926,139 | A | | 7/1999 | Korisch | ...................... 343/700 |
| 6,061,037 | A | * | 5/2000 | Brouwers et al. | .......... 343/895 |
| 6,166,694 | A | | 12/2000 | Ying | .......................... 343/702 |
| 6,201,501 | B1 | * | 3/2001 | Arkko et al. | ............... 343/702 |
| 6,271,794 | B1 | * | 8/2001 | Geeraert | .............. 343/700 MS |
| 6,336,037 | B1 | * | 1/2002 | Sekine et al. | ............ 455/550.1 |
| 6,353,443 | B1 | | 3/2002 | Ying | ........................... 343/850 |
| 6,411,826 | B1 | * | 6/2002 | Camp, Jr. | .................... 455/566 |
| 6,480,614 | B1 | * | 11/2002 | Denda et al. | ............... 381/423 |
| 6,819,939 | B1 | * | 11/2004 | Masamura | ............... 455/550.1 |
| 6,904,296 | B1 | * | 6/2005 | Geeraert et al. | ......... 455/550.1 |
| 6,995,715 | B1 | * | 2/2006 | Ying et al. | .................. 343/702 |
| 7,069,061 | B1 | * | 6/2006 | Gammon et al. | ........ 455/575.1 |
| 2001/0050643 | A1 | | 12/2001 | Egorov et al. | .............. 343/702 |
| 2003/0068987 | A1 | | 4/2003 | Dufosse et al. | ............... 455/90 |

(Continued)

FOREIGN PATENT DOCUMENTS

EP    1 271 793    1/2003

(Continued)

OTHER PUBLICATIONS

"Card Type Speakers: WM-R30B, WM-R57A," Panasonic (published prior to Aug. 1, 2003).

(Continued)

*Primary Examiner*—Tho Phan
*Assistant Examiner*—Chuc Tran
(74) *Attorney, Agent, or Firm*—Myers Bigel Sibley & Sajovec (57) ABSTRACT

Antenna subassemblies and wireless terminals are provided. The antenna subassembly includes a planar antenna and a flat-panel speaker that can be integrated with the planar antenna. The wireless terminal includes a flat-panel speaker and a planar antenna, integrated or not, positioned adjacent one another on the same side of an electronic circuit in a housing.

28 Claims, 8 Drawing Sheets

U.S. PATENT DOCUMENTS

| | | | |
|---|---|---|---|
| 2003/0107478 A1* | 6/2003 | Hendricks et al. | 340/311.2 |
| 2003/0216157 A1* | 11/2003 | Wang et al. | 455/575.1 |
| 2004/0171404 A1* | 9/2004 | Annamaa et al. | 455/550.1 |
| 2005/0024271 A1* | 2/2005 | Ying et al. | 343/702 |

FOREIGN PATENT DOCUMENTS

| | | |
|---|---|---|
| WO | 03/003505 | 1/2003 |
| WO | 03/003506 | 1/2003 |

OTHER PUBLICATIONS

Kin-Lu Wong, "Planar Antennas for Wireless Communications," Chapter 1, John Wiley & Sons, Ltd. copyright 2000-2003 http://www.wileyeurope.com (date of access Apr. 15, 2003).

Notification of Transmittal of the International Search Report and the Written Opinion of the International Searching Authority, or the Declaration for PCT/US2004/020084 dated Oct. 15, 2004.

* cited by examiner

INTERNAL ANTENNA AND FLAT PANEL SPEAKER ASSEMBLIES AND MOBILE TERMINALS INCLUDING THE SAME

FIELD OF THE INVENTION

The present invention relates to the field of communications, and, more particularly, to antennas and wireless terminals incorporating the same.

BACKGROUND OF THE INVENTION

Manufacturers and designers of personal electronic devices, such as cellular radio telephones, frequently seek to reduce the overall dimensions of such devices while maintaining attractive style characteristics for the devices. One consequence of the reduced size for such devices that include a speaker is that less space may be available for the speaker. Furthermore, a variety of audio signal generation capabilities may be desired in such personal electronic devices including buzzers, voice signal generation and/or music or other higher frequency band signal reproduction and playback.

As the space available for the hardware supporting the audio signal generation capabilities decreases in the personal electronic devices, it may become more difficult to support multiple sound emitting output devices, and the space available for each such device may become smaller. Furthermore, increased functionality in such personal electronic devices may require more of the reduced available space to be utilized for other functionality of the device. The reduction in the size of the audio output devices may also increase the difficulty of providing a desirable loudness level for signals, such as buzzer alert signals.

One way to meet the demand for a reduction in the size of personal electronic devices is to use flat-panel speakers in place of the conventional speakers. Flat-panel speakers vibrate air using a large, thin conductive diaphragm panel, rather than the traditional cone-shaped panel, and, therefore, require less space.

There is also an interest in small antennas that can be utilized as internally mounted antennas for wireless terminals. Planar inverted-F antennas (PIFA's), for example, may be well suited for use within the confines of wireless terminals, particularly wireless terminals undergoing miniaturization with a desire for increasingly larger displays. Typically, conventional PIFA's include a conductive element that is maintained in a spaced apart relationship with a ground plane. Exemplary PIFA's are described in U.S. Pat. Nos. 6,166,694 and 6,353,443, which are incorporated herein by reference in their entirety.

Conventionally, PIFA configurations have branched structures such as described in U.S. Pat. No. 5,926,139, and position the PIFA a suitable distance, typically from about 5–10 mm, from the ground plane to radiate effectively. Kin-Lu Wong, in *Planar Antennas for Wireless Communications*, Ch. 1; p. 4, (Wiley, January 2003), illustrates some potential radiating top patches for dual-frequency PIFAS. The contents of each of these references are hereby incorporated by reference in their entirety herein.

Despite the foregoing, there remains a need for improved and/or alternative speaker and antenna configurations.

SUMMARY OF THE INVENTION

Embodiments of the present invention provide internal antennas and flat-panel speakers for communications devices and wireless terminals. Embodiments of the invention include an integrated planar antenna and flat-panel speaker. Thus, for example, the planar antenna and the flat-panel speaker can be formed on a common substrate.

Certain embodiments are directed to an antenna subassembly. The antenna subassembly includes: (a) a planar antenna; and (b) a flat-panel speaker that is integrated with the planar antenna. In particular embodiments, the flat-panel speaker is configured to act as a parasitic element to the planar antenna. Thus, for example, the flat-panel speaker can be configured to provide a lower frequency range, an increased bandwidth, and/or a multi-band frequency response for the planar antenna, as compared to the frequency response of the planar antenna alone.

Other embodiments are directed to a wireless terminal. The wireless terminal includes: (a) a housing; (b) an electronic circuit disposed within the housing; (c) a flat-panel speaker proximate a back side of the electronic circuit within the housing; and (d) an internal antenna proximate the flat-panel speaker on the back side of the electronic circuit within the housing. In certain embodiments, the planar antenna and the flat-panel speaker are merely co-located adjacent each other on the same side of the electronic circuit, while in others they are integrated into a common body or substrate.

In particular embodiments, the housing of the wireless terminal includes an earpiece and a keyboard on its front face, and the electronic circuit is positioned between the front face of the housing and the flat-panel speaker. In such embodiments, therefore, the wireless terminal further includes a forward acoustic passageway that extends from the flat-panel speaker to the earpiece and includes at least one acoustic aperture extending through the electronic circuit adjacent the flat-panel speaker.

In certain embodiments, the electronic circuit of the wireless terminal includes an audio driver circuit in communication with the flat-panel speaker. In other embodiments the audio driver circuit is coupled through a balanced feed to the flat-panel speaker. In still other embodiments, the balanced feed includes a plurality of leads with an RF isolation circuit on each lead. Thus, for example, the balanced feed can include a tank circuit and/or an inductor on each lead of the balanced feed.

These and other embodiments will be described further below.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be appreciated that although discussed with respect to a certain antenna embodiment, features or operation of one antenna embodiment can apply to others.

In the drawings, the thickness of lines, layers, features, components and/or regions may be exaggerated for clarity. It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected" or "coupled" to another feature or element, it can be directly connected to the other element or intervening elements may be present. In contrast, when a feature or element is referred to as being "directly connected" or "directly coupled" to another element, there are no intervening elements present. However, it is noted that the presence of a coating or film layer on a substrate does not exclude the conductive element from being "directly formed" on the substrate albeit over the coating or film thereon.

The terms "comprises, comprising" and derivatives thereof, means that the recited feature, operation, integer, component, step, and the like is present but does not exclude or preclude the presence or addition of one or more alternative or different features, integers, steps, components or groups.

As used herein, the term "wireless terminal" may include, but is not limited to, a cellular wireless terminal with or without a multi-line display; a Personal Communications System (PCS) terminal that may combine a cellular wireless terminal with data processing, facsimile and data communications capabilities; a PDA (personal digital assistant) that can include a wireless terminal, pager, internet/intranet access, web browser, organizer, calendar and/or a GPS receiver; and a conventional laptop and/or palmtop receiver or other appliance that includes a wireless terminal transceiver. Wireless terminals may also be referred to as "pervasive computing" devices and may be mobile terminals including portable radio communication equipment. The term "portable radio communication equipment" (which can also be referred to interchangeably as "a mobile radio terminal") includes all portable equipment such as mobile telephones, pagers, and communicators, including, but not limited to, smart phones, electronic organizers, and the like.

It will be understood by those having skill in the art of communications devices that an antenna is a device that may be used for transmitting and/or receiving electrical signals. During transmission, the antenna may accept energy from a transmission line and radiate this energy into space. During reception, the antenna may gather energy from an incident wave and provide this energy to a transmission line. The amount of power radiated from or received by an antenna is typically described in terms of gain.

Figure 1:
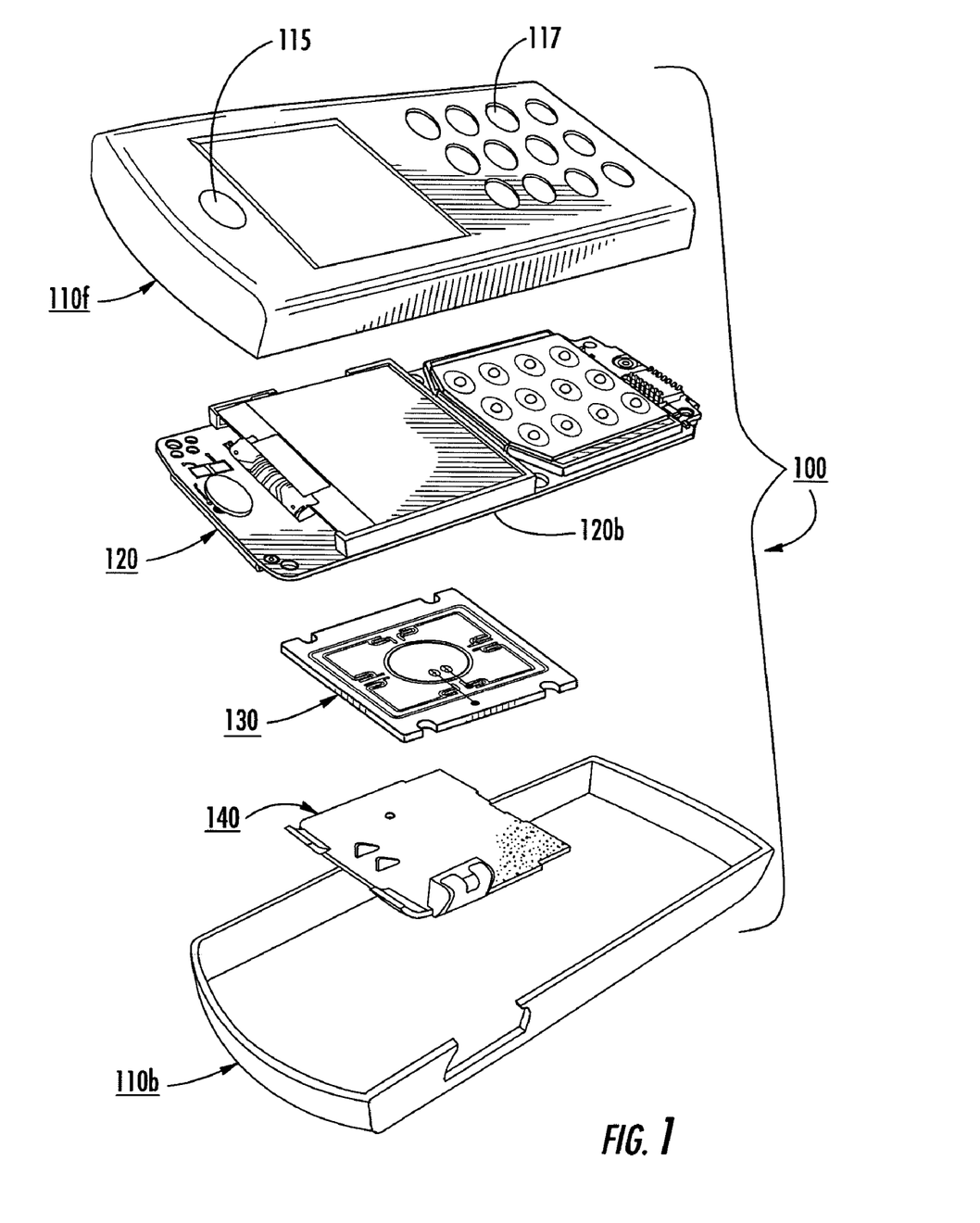
FIG. 1 is an exploded perspective view of a wireless terminal device according to embodiments of the present invention.

Embodiments of the present invention will now be described in detail below with reference to the figures. FIG. 1 is an exploded perspective view of a wireless terminal 100. As illustrated, the wireless terminal 100 includes a front face 110$f$ and a back face 110$b$ that mate to define a portable housing of the wireless terminal 100. The wireless terminal 100 includes an electronic circuit 120, a flat-panel speaker 130 and an internal antenna 140 that are positioned within the housing. The internal antenna 140 is typically a planar antenna 140 and configured as a PIFA, a single-contact patch antenna, or a bent monopole antenna. Although certain embodiments are described with respect to a planar inverted-F antenna, the antenna may not be strictly "planar" although in the vernacular of the art, it might still be referred to as a planar inverted-F antenna.

In addition, the electronic circuit 120 of the wireless terminal 100 may comprise a printed circuit board (PCB) having a signal feed and ground plane wherein the planar antenna 140 is operatively coupled to the signal feed and ground plane of the PCB. It will be understood that although the term "ground plane" is used throughout the application, the term "ground plane", as used herein, is not limited to the form of a plane. For example, the "ground plane" may be a strip or any shape or reasonable size and may include non-planar structures such as shield cans or other metallic objects.

As shown in FIG. 1, the front face 110$f$ of the housing includes an earpiece 115 and a keypad 117. The electronic circuit 120 is positioned between the front face 110$f$ and the back face 110$b$ of the housing. The flat-panel speaker 130 and the planar antenna 140 are held in the housing so that they are both between the back side of the electronic circuit 120$b$ and the back face of the housing 110$b$. The flat-panel speaker 130 and the planar antenna 140 may be disposed on separate substrates, as shown, or they may be integrated, for example, by using a common substrate, as will be discussed further below. In position, the earpiece 115 outputs acoustic signals/sound from the speaker to a user.

Figure 2A:
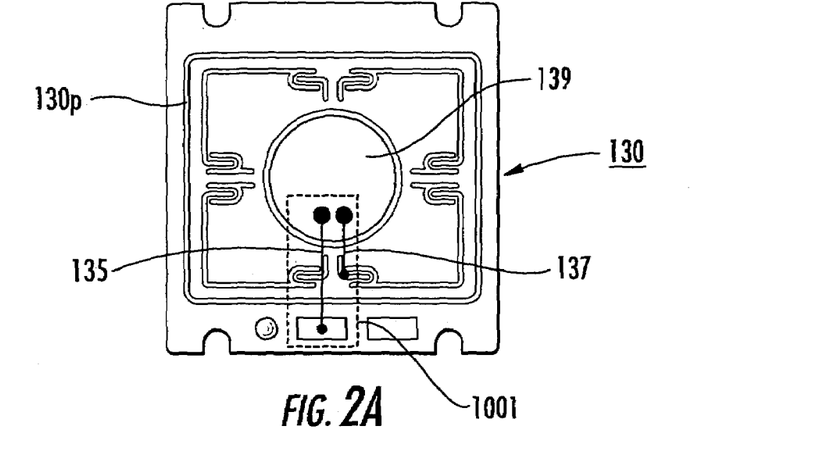
FIGS. 2A–2C are the top, bottom and side view, respectively, of a flat-panel speaker according to embodiments of the present invention.
Figure 2B:
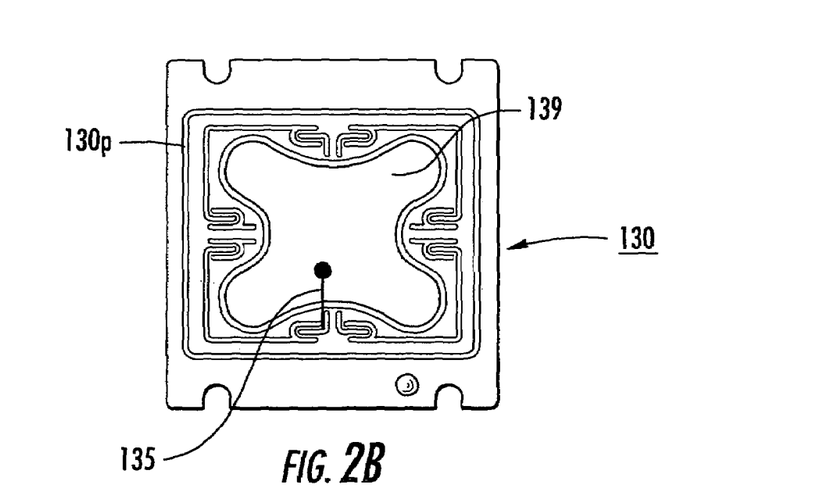
Figure 2C:
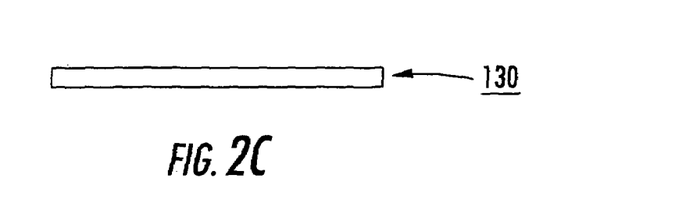

FIGS. 2A–2C show the top, bottom and side views of a conventional flat-panel speaker 130. As illustrated, the flat-panel speaker 130 is a substantially planar element that comprises a conductive pattern 130$p$, leads 135, 137 for communicating with the electronic circuit 120 and a thin diaphragm panel component 139 that provides an acoustic response to an input signal. The diaphragm component 139 may be a divided diaphragm panel and may be formed of a piezo electric material, such as piezo ceramic. The terms "lead" and "trace" are used interchangeably throughout to indicate electrical paths.

An exemplary flat-panel speaker configured for use in personal electronic devices can be obtained from Panasonic, distributed by DigiKey located in, South Theif River Falls, Minn. called a "card-type speaker" with part no. WM R03B. The Panasonic card-type speaker features an ultra-thin, ultra-light piezo ceramic divided diaphragm. The two-way mechanical structure of the divided diaphragm, combining one large speaker for low-frequency sounds with four small speakers for high-frequency sounds makes broad-spectrum audio reproduction possible. In addition, the vibrating membrane can be covered with a high polymer coating to protect against dampness, dust and corrosion.

Figure 3A:
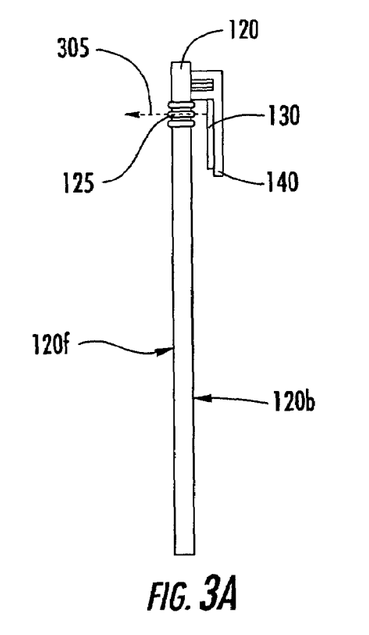
FIGS. 3A–3D are side views of exemplary planar antenna and a flat-panel speaker subassemblies according to embodiments of the present invention.
Figure 3B:
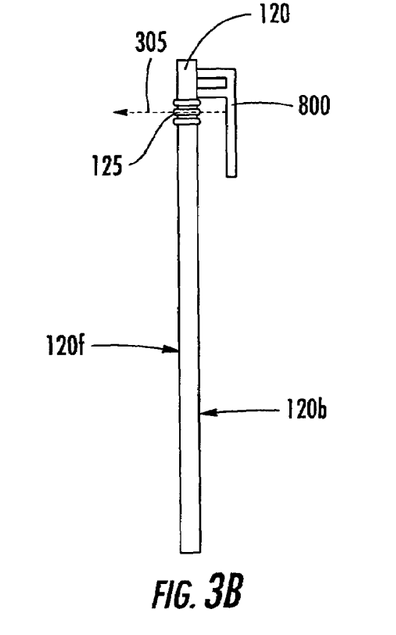
Figure 3C:
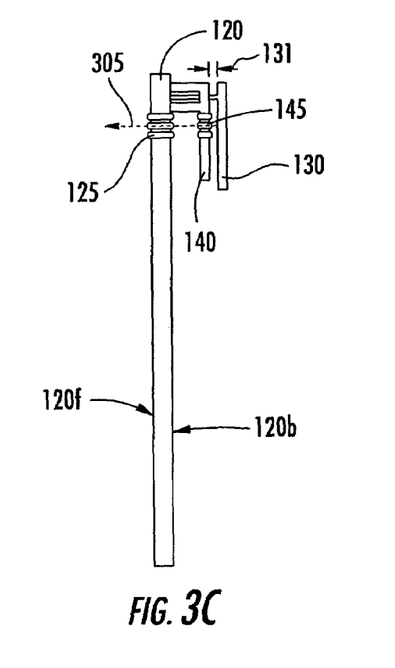

FIGS. 3A–3D illustrate exemplary locations where the flat-panel speaker 130 can be placed with respect to the electronic circuit 120 and the planar antenna 140. As shown, the flat-panel speaker 130 and the planar antenna 140 can be positioned proximate each other on the back side 120b of the electronic circuit 120. Because of this positioning, at least one acoustic aperture can be formed in the PCB, or electronic circuit, to define a forward acoustic passageway 305 that extends from the flat-panel speaker 130 to the front side 120f of the electronic circuit 120. Thus, to guide the acoustic output to the earpiece (115 FIG. 1) in order to reduce acoustic interference during operation, at least one acoustic aperture 125 can be formed so that it extends through the electronic circuit 120. The direction of the acoustic output is indicated in FIGS. 3A–3D by the broken-line arrow. In the case where the planar antenna 140 is positioned between the flat-panel speaker 130 and the electronic circuit 120, as illustrated in FIG. 3C, at least one acoustic aperture 145 extending through the planar antenna 140 is also created. The direction of the forward acoustic passageway 305 is illustrated by the broken-line arrow extending from the flat-panel speaker 130 through the electronic circuit 120. The wireless terminal could also include an enclosed acoustic channel, not shown, that may be used to guide the acoustic output for improved signal clarity.

As shown in FIG. 3A the flat-panel speaker 130 can be a separate component from the antenna 140 and placed between the planar antenna 140 and the electronic circuit 120 so that it abuts the planar antenna 140. FIG. 3B illustrates that the flat-panel speaker 130 can be integrated with the planar antenna 140 to create an integrated flat-panel speaker/planar antenna 800, as will be discussed further with respect to FIGS. 8 and 9.

Figure 3D:
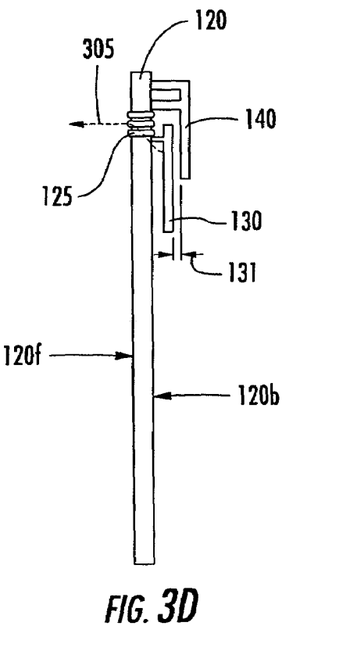

FIGS. 3C and 3D show that the flat-panel speaker 130 can be offset with a lateral or transverse gap space 131 separating it from the planar antenna 140. The planar antenna 140 may be placed between the flat-panel speaker 130 and the electronic circuit 120, as shown in FIG. 3C. FIG. 3D illustrates that the flat-panel speaker 130 may be positioned between the planar antenna 140 and the electronic circuit 120 and offset in the longitudinal direction so that it is below or above (not shown) the planar antenna 140. In addition, although not shown, the planar antenna 140 can be positioned closer to the flat-panel speaker 130 then longitudinally offset therefrom. The term "proximate" means that the flat-panel speaker 130, and the planar antenna 140 are spatially aligned on a common side of the electronic circuit 120 within the housing typically so that a portion of the flat-panel speaker 130 overlies the planar antenna 140, or vice versa.

Figure 4A:
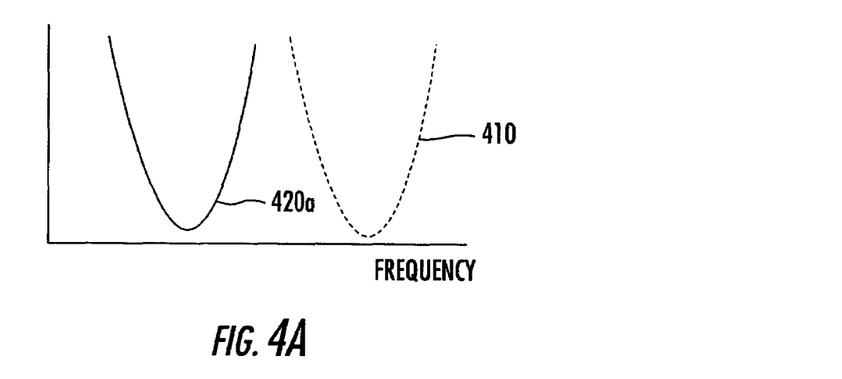
FIGS. 4A–4C are simulated graphs of Voltage Standing Wave Ratios illustrating exemplary frequency responses of a planar antenna according to embodiments of the present invention.
Figure 4B:
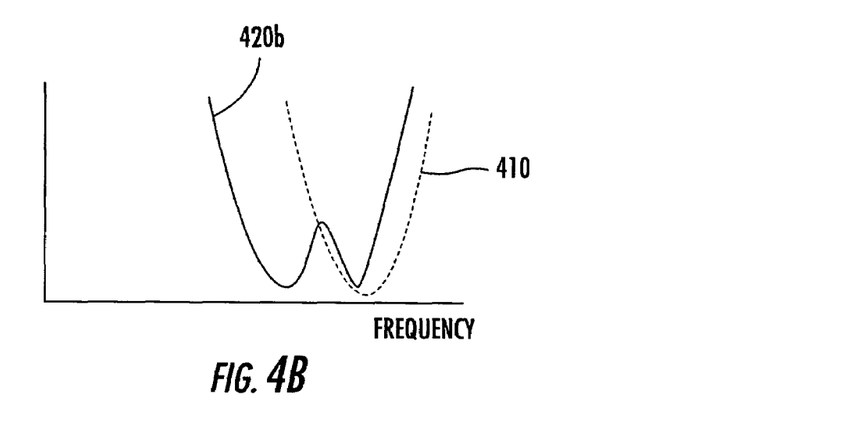
Figure 4C:
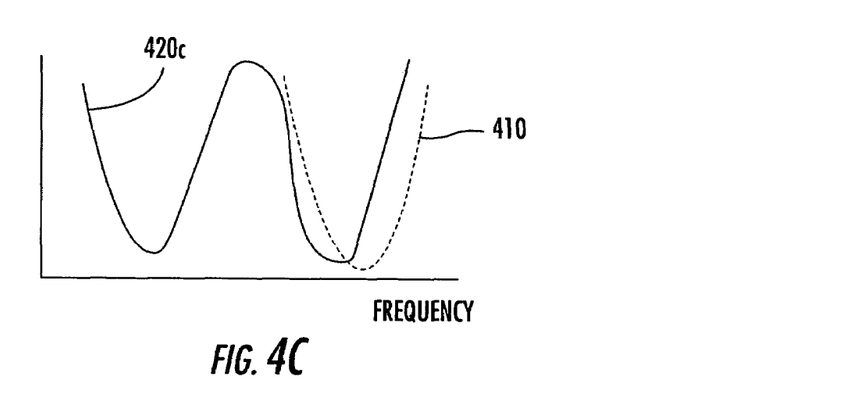

By positioning, configuring and/or electrically connecting the flat-panel speaker 130 with respect to the planar antenna 140, the flat-panel speaker 130 can be configured to function as a parasitic element to the planar antenna 140 in certain frequency ranges. FIGS. 4A–4C illustrate exemplary frequency responses of the planar antenna 140 according to various embodiments of the present invention. The graphs represent Voltage Standing Wave Ratios (VSWR's). VSWR relates to the impedance match of an antenna feed point with a feed line or transmission line of a communications device, such as a wireless terminal. To radiate radio frequency energy with minimum loss, or to pass along received RF energy to a wireless terminal receiver with minimum loss, the impedance of a wireless terminal antenna is conventionally matched to the impedance of a transmission line or feed point. Conventional wireless terminals typically employ an antenna that is electrically connected to a transceiver operatively associated with a signal processing circuit positioned on an internally disposed printed circuit board. In order to increase the power transfer between an antenna and a transceiver, the transceiver and the antenna may be interconnected such that their respective impedances are substantially "matched," i.e., electrically tuned to compensate for undesired antenna impedance components, to provide a 50-Ohm ($\Omega$) (or desired) impedance value at the feed point.

In FIGS. 4A–4C, the broken line 410 illustrates a simulated frequency response of a planar antenna 140 operating independent of the flat-panel speaker 130 and therefore being substantially unaffected by the flat-panel speaker 130, while the solid lines 420a, 420b and 420c illustrate an altered frequency response of a planar antenna 140 influenced by the contribution of the flat-panel speaker 130 when configured as a parasitic element. As shown in FIG. 4A, the flat-panel speaker 130 can be configured and/or positioned with respect to the planar antenna 140 (FIG. 1) to provide a lower frequency range for frequency response 420a for the planar antenna 140. FIG. 4B illustrates that the flat-panel speaker 130 can be configured to provide an increased bandwidth frequency response 420b, while FIG. 4C illustrates that the flat-panel speaker 130 can be configured to provide a multi-band frequency response 420c.

Figure 5:
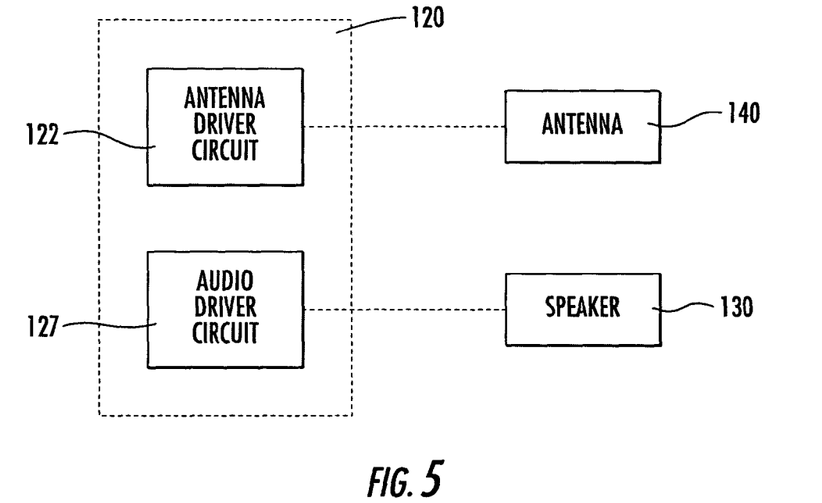
FIGS. 5 and 6 are schematic block diagrams illustrating exemplary components of an electronic circuit and connections between the components and the planar antenna and/or flat-panel speaker according to embodiments of the present invention.
Figure 6:
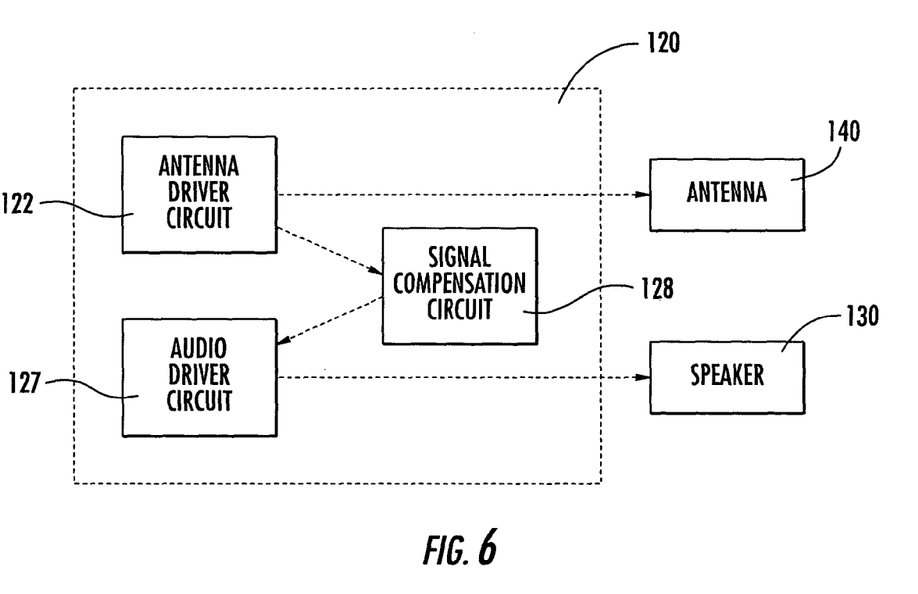

FIGS. 5 and 6 illustrate exemplary components in the electronic circuit 120 (the electronic circuit 120 is illustrated by the rectangular broken line) and connections between the components and the planar antenna 140 and/or flat-panel speaker 130 according to embodiments of the present invention. As shown in FIG. 5, the electronic circuit 120 can include an antenna driver circuit 122 in electrical communication with the planar antenna 140 and an audio driver circuit 127 in electrical communication with the flat-panel speaker 130. Exemplary signal compensation techniques of coupling the audio driver circuit 127 to the flat-panel speaker 130 are discussed with respect to FIGS. 6 and 7A–7C below.

As shown in FIG. 6, the electronic circuit 120 can further include a signal compensation circuit 128. In operation, the signal compensation circuit 128 detects when the antenna 140 is in transmit mode, i.e., when it is accepting energy from a transmission line and radiating this energy into space. During a detected transmission, the signal compensation circuit 128 compensates the signal from the audio driver circuit 127 to the flat-panel speaker 130 to inhibit noise from being communicated by the flat-panel speaker 130. The signal compensation circuit 128 can be any suitable signal processing circuit including hardware and/or software components as is known to those of skill in the art.

Figure 7A:
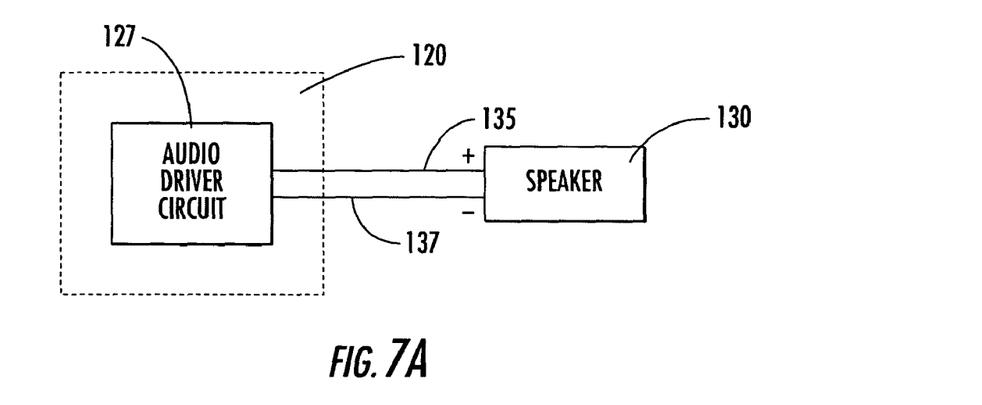
FIGS. 7A–7C are schematic block diagrams illustrating exemplary couplings between an audio driver circuit and a flat-panel speaker according to embodiments of the present invention.
Figure 7B:
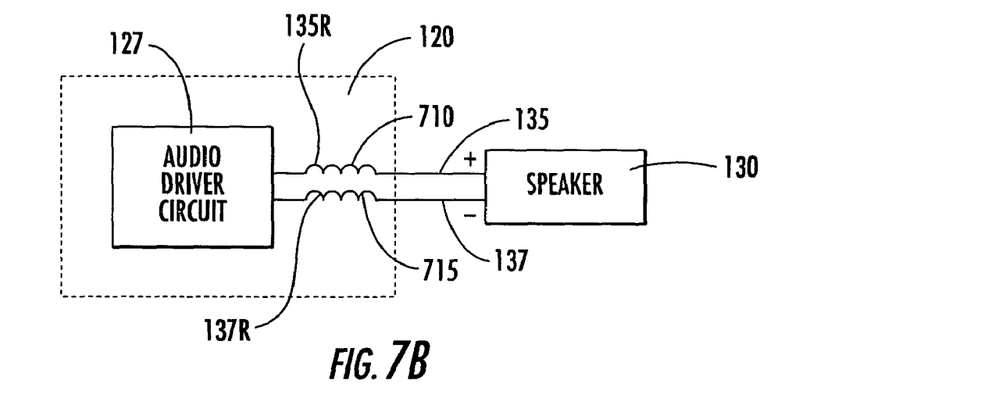
Figure 7C:
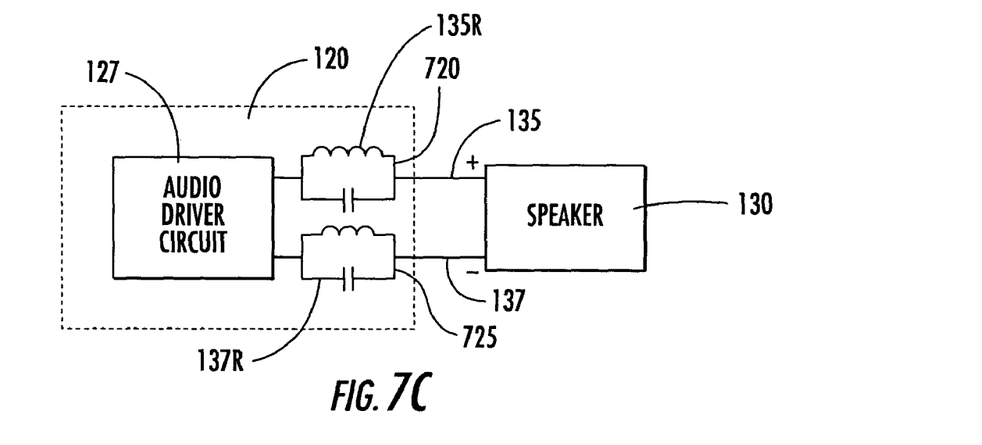

FIGS. 7A–7C illustrate that the audio driver circuit 127 of the electronic circuit 120 can be coupled to the flat-panel speaker 130 through a balanced feed 1001 (FIG. 2A). As is known to those of skill in the art, the term "balanced feed" refers to transmitting a differential signal over leads having positive and negative voltages, rather than leads representing signal and ground voltages, in order to reduce the susceptibility to noise either internally generated by the wireless terminal or external noise.

As shown in FIG. 7A, the leads 135, 137 of the flat-panel speaker 130 may have a direct connection to the audio driver circuit 127. Alternatively, an RF isolation circuit 135R, 137R, comprising either an inductor 710, 715, one on each lead 135, 137, or a tank circuit 720,725 on respective leads 135 and 137, may be used to couple the audio driver circuit 127 and the flat-panel speaker 130, as shown in FIGS. 7B and 7C. Other RF isolation circuit configurations may also be used as is known to those of skill in the art.

Figure 8A:
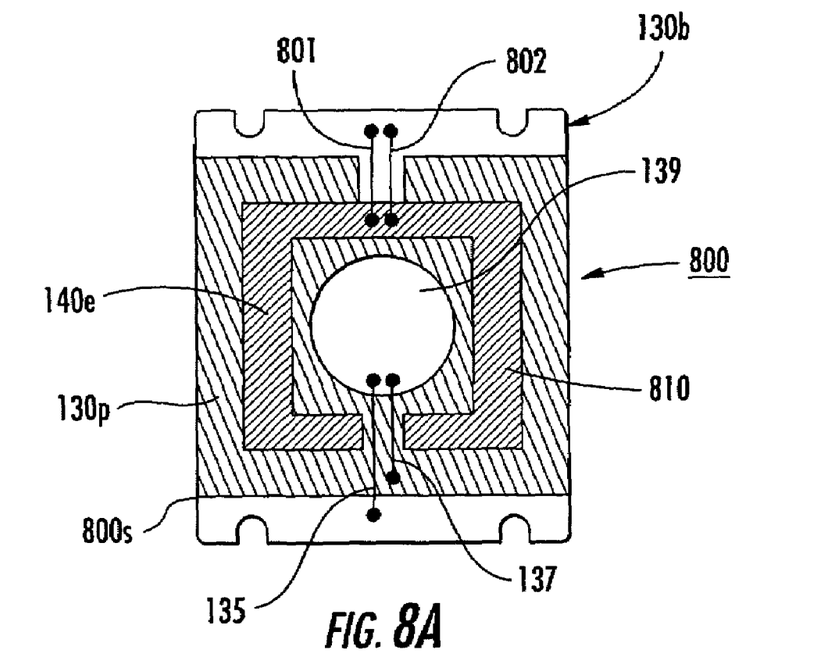
FIG. 8A is a top view of an exemplary flat-panel speaker integrated with a planar antenna.

As shown in FIG. 8A, certain embodiments of the invention include a planar antenna 140 that is "integrated" or "integral" with a flat-panel speaker 130 (referred to generally as integrated device 800). The terms "integrated" or "integral" mean that the flat-panel speaker 130 and the planar antenna 140 are combined so that at least a portion of the planar antenna 140 is etched, printed or otherwise formed on, attached to, and/or supported by the substrate forming the flat-panel speaker 130. The substrate 800s may include a single layer or a plurality of layers.

FIG. 8A illustrates that the conductive element 140e of the planar antenna 140, as well as the conductive pattern 130p of the flat-panel speaker 130 can be formed on the first primary surface of the flat-panel speaker body 130b and the substrate 800s may include a single layer of material. FIG. 8 also shows antenna leads 801, 802 (i.e., ground and signal paths) and flat-panel speaker leads 135, 137 on the integrated flat-panel speaker/planar antenna component 800.

Figure 8B:
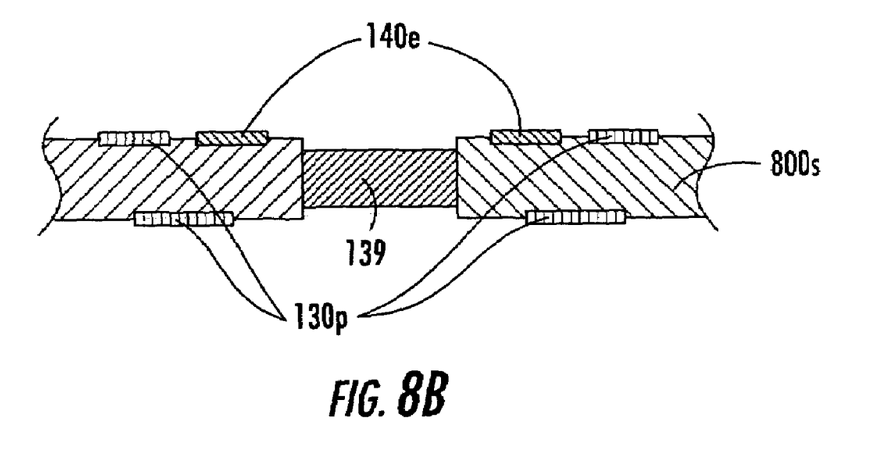
FIG. 8B is a cross section side view of the exemplary flat-panel speaker integrated with a planar antenna shown in FIG. 8A.

FIG. 8B shows the cross section of the exemplary integrated flat-panel speaker/planar antenna component 800 shown in FIG. 8A. As shown, the flat-panel speaker conductive pattern 130p and diaphragm component 139 are formed on the first and the second primary sides of the single-layer substrate 800s. The antenna conductive element 140e is formed on the first primary side of the same substrate 800s.

Figure 9A:
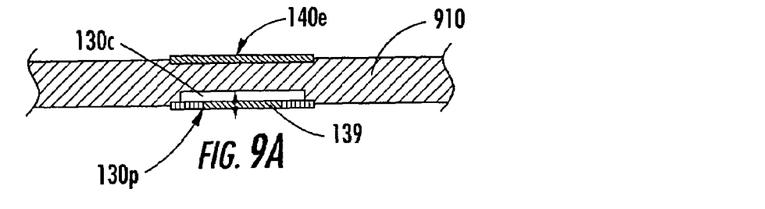
FIGS. 9A–9E are cross section side views of exemplary substrate bodies integrating a flat-panel speaker and a planar antenna.

FIGS. 9A–9E illustrate that the substrate 800s can be formed of one (FIGS. 8 and 9A) or a plurality (FIGS. 9B–9E) of material layers. Typically the layers 910, 920 and/or 930 are made from non-conductive material with conductive portions configured to define the planar antenna 140 and the flat-panel speaker 130. The layers 910, 920 and/or 930 may be thin film or other substrate layers, typically less than 5 mm thick, and more typically less than about 1 mm, and more typically between about 0.2–0.5 mm thick. FIG. 9A shows substrate 800s as a single layer 910 with a cutout or space 130c to allow the diaphragm component 139 to flex. In embodiments where the substrate is made from a flexible material, a cutout 130c may not be needed. As shown, the antenna conductive element 140e may be formed on the first primary surface of the material layer 910, while the speaker conductive pattern 130p may be formed on the second primary surface.

Figure 9B:
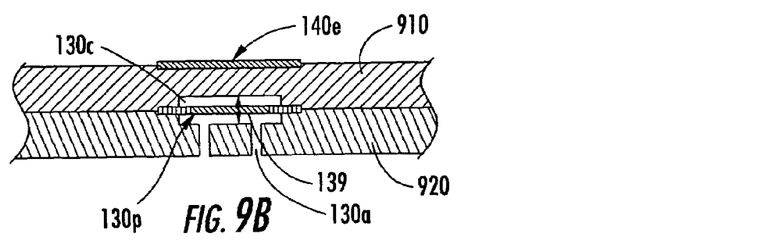
Figure 9C:
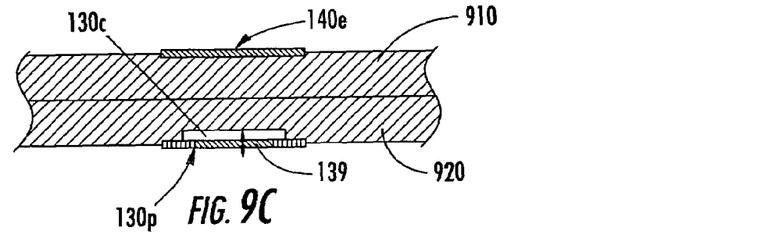

FIGS. 9B and 9C show substrate 800s as two layers 910 and 920 with the antenna conductive element 140e formed on a first primary surface of the first layer 910. FIG. 9B shows the speaker conductive pattern 130p formed on the first primary surface of the second layer 920, while FIG. 9C shows the speaker conductive pattern 130p on the second primary surface of the second layer 920. FIGS. 9B and 9C also show a cutout 130c to allow the diaphragm component 139 to flex. As shown in FIG. 9B, the cutout 130c can extend above and below the diaphragm component 139 to allow movement in either direction. FIG. 9B further shows acoustic apertures 130a extending through the second layer 920 to the second primary surface of the second layer 920 to allow for transmission of the acoustic signal.

Figure 9D:
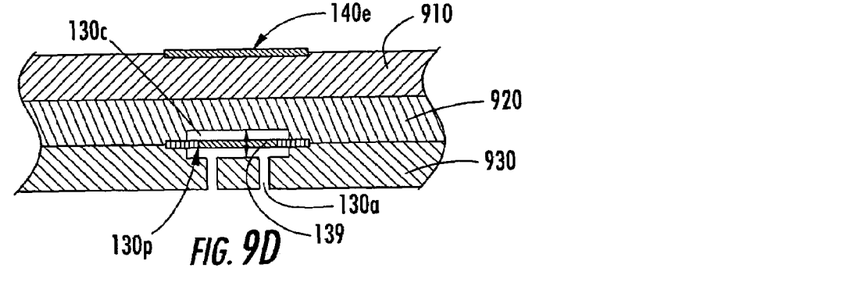
Figure 9E:
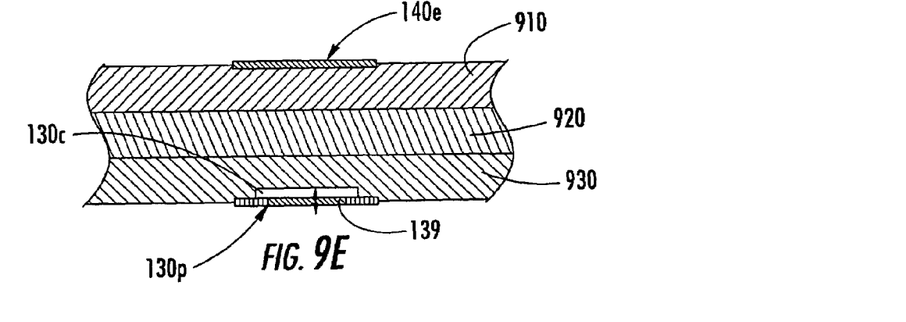

FIGS. 9D and 9E show substrate 800s as three layers 910, 920 and 930 with the antenna conductive element 140e on the first primary surface of the first layer 910. FIG. 9D shows the speaker conductive pattern 130p formed on the first primary surface of the third layer 930, while FIG. 9E shows the speaker conductive pattern 130p on the second primary surface of the third layer 930. FIGS. 9D and 9E also show a cutout 130c to allow the diaphragm component 139 to flex, with the cutout 130c of FIG. 9D extending above and below the diaphragm component 139. FIG. 9D further shows acoustic apertures 130a extending through the third layer 930 to the second primary surface of the third layer 930 to allow for transmission of the acoustic signal.

It will be understood that, although antennas according to embodiments of the present invention are described herein with respect to wireless terminals, embodiments of the present invention are not limited to such a configuration. For example, antennas according to embodiments of the present invention may be used within wireless terminals that may only transmit or only receive wireless communications signals. For example, conventional AM/FM radios or any receiver utilizing an antenna may only receive communications signals. Alternatively, remote data input devices may only transmit communications signals.

In the drawings and specification, there have been disclosed embodiments of the invention and, although specific terms are employed, they are used in a generic and descriptive sense only and not for purposes of limitation, the scope of the invention being set forth in the following claims. Thus, the foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A wireless terminal comprising:
   a housing including an earpiece on a front face of the housing;
   an electronic circuit disposed within the housing;
   a flat-panel speaker positioned proximate a back side of the electronic circuit within the housing wherein the flat-panel speaker is formed of a piezo electric material; and
   an internal antenna positioned proximate the flat-panel speaker on the back side of the electronic circuit within the housing, wherein the electronic circuit is positioned between the front face of the housing and the flat panel speaker and internal antenna.

2. The wireless terminal of claim 1, wherein the flat-panel speaker is integrated with the internal antenna.

3. The wireless terminal of claim 2, wherein the flat-panel speaker and the internal antenna each comprise conductive portions that reside on a first primary surface of a common substrate.

4. The wireless terminal of claim 1, wherein the internal antenna is a planar antenna.

5. The wireless terminal of claim 1, wherein the housing includes a keyboard on the front face of the housing.

6. The wireless terminal of claim 5, wherein the electronic circuit comprises a printed circuit board, and wherein the wireless terminal further comprises a forward acoustic passageway extending from the flat-panel speaker to the earpiece, the forward acoustic passageway comprising at least one acoustic aperture extending through the printed circuit board adjacent the flat-panel speaker.

7. The wireless terminal of claim 1, wherein the flat-panel speaker is configured to act as a parasitic element to the internal antenna.

8. The wireless terminal of claim 7, wherein the flat-panel speaker is configured to act as a parasitic element that provides a lower frequency range frequency response for the internal antenna.

9. The wireless terminal of claim 7, wherein the flat-panel speaker is configured to act as a parasitic element that provides a multi-band frequency response for the internal antenna.

10. The wireless terminal of claim 1, wherein the internal antenna comprises a planar inverted-F antenna (PIFA).

11. The wireless terminal of claim 1, wherein the internal antenna comprises a single-contact patch antenna.

12. The wireless terminal of claim 1, wherein the internal antenna comprises a monopole antenna.

13. A wireless terminal comprising:
a housing including an earpiece and a keyboard on a front face of the housing;
a printed circuit board disposed within the housing;
a flat-panel speaker positioned proximate a back side of the electronic circuit within the housing;
a forward acoustic passageway extending from the flat-panel speaker to the earpiece, the forward acoustic passageway comprising at least one acoustic aperture extending through the printed circuit board adjacent the flat-panel speaker; and
an internal antenna positioned proximate the flat-panel speaker on the back side of the electronic circuit within the housing, wherein the electronic circuit is positioned between the front face of the housing and the flat panel speaker and internal antenna;
wherein the internal antenna is positioned between the printed circuit board and the flat-panel speaker and wherein the forward acoustic passageway further comprises at least one acoustic aperture extending through the internal antenna.

14. The wireless terminal of claim 1, wherein the electronic circuit comprises a printed circuit board having a signal feed and a ground plane, and wherein the internal antenna is operatively coupled to the signal feed and the ground plane.

15. A wireless terminal comprising:
a housing;
an electronic circuit disposed within the housing;
a flat-panel speaker positioned proximate a back side of the electronic circuit within the housing;
an internal antenna positioned proximate the speaker on the back side of the electronic circuit within the housing; and
wherein the electronic circuit includes an audio driver circuit coupled through a balanced feed to the speaker.

16. The wireless terminal of claim 15, wherein the balanced feed comprises a plurality of leads, and wherein the electronic circuit further comprises an RF isolation circuit on each lead of the balanced feed.

17. The wireless terminal of claim 16, wherein the RF isolation circuit comprises a tank circuit.

18. The wireless terminal of claim 16, wherein the RF isolation circuit comprises an inductor.

19. A wireless terminal comprising:
a housing;
an electronic circuit disposed within the housing;
a flat-panel speaker positioned proximate a back side of the electronic circuit within the housing wherein the flat-panel speaker is formed of a piezo electric material;
an internal antenna positioned proximate the flat-panel speaker on the back side of the electronic circuit within the housing; and
wherein the flat-panel speaker is configured to act as a parasitic element to the internal antenna that provides an increased bandwidth frequency response for the internal antenna.

20. A wireless terminal comprising:
a housing including an earpiece on a front face of the housing;
an electronic circuit disposed within the housing;
an internal antenna; and
a flat-panel speaker integrated with the internal antenna and positioned proximate a back side of the electronic circuit within the housing;
wherein the electronic circuit is positioned between the front face of the housing and the flat-panel speaker integrated with the internal antenna and wherein-the electronic circuit comprises:
an audio driver circuit coupled to the flat-panel speaker through a balanced feed comprising a plurality of leads;
an antenna driver circuit in communication with the internal antenna; and
a signal compensation circuit in communication with the audio driver circuit and the antenna driver circuit, wherein when the internal antenna is in transmit mode the signal compensation circuit compensates a signal from the audio driver circuit to the flat-panel speaker.

21. An antenna subassembly for use with a wireless terminal device, comprising:
a planar antenna;
a flat-panel speaker, wherein the speaker is integrated with the planar antenna; and
wherein the antenna subassembly further comprises an electronic circuit including an audio driver circuit coupled through a balanced feed to the speaker, wherein the balanced feed comprises a plurality of leads, and wherein the electronic circuit further comprises an RF isolation circuit on each lead of the balanced feed.

22. The antenna subassembly of claim 21, wherein the RF isolation circuit comprises a tank circuit.

23. The antenna subassembly of claim 21, wherein the RF isolation circuit comprises an inductor.

24. An antenna subassembly for use with a wireless terminal device, comprising:
a planar antenna; and
a flat-panel speaker, wherein the flat-panel speaker is integrated with the planar antenna and wherein the flat-panel speaker is configured to act as a parasitic element to the planar antenna, wherein the flat-panel speaker is configured to act as a parasitic element that provides a lower frequency range frequency response for the planar antenna.

25. The antenna subassembly of claim 24, wherein the flat-panel speaker is configured to act as a parasitic element that provides a multi-band frequency response for the planar antenna.

26. The antenna subassembly of claim 24, wherein the planar antenna comprises a planar inverted-F antenna (PIFA).

27. The antenna subassembly of claim 24, wherein the planar antenna comprises a single-contact patch antenna.

28. The antenna subassembly of claim 24, wherein the planar antenna comprises a monopole antenna.

* * * * *